(No Model.)

J. H. GORE.
PARLIAMENTARY INDEX.

No. 509,891. Patented Dec. 5, 1893.

Witnesses

Inventor
James Howard Gore

Attorneys.

UNITED STATES PATENT OFFICE.

JAMES HOWARD GORE, OF WASHINGTON, DISTRICT OF COLUMBIA.

PARLIAMENTARY INDEX.

SPECIFICATION forming part of Letters Patent No. 509,891, dated December 5, 1893.

Application filed February 11, 1893. Serial No. 461,896. (No model.)

*To all whom it may concern:*

Be it known that I, JAMES HOWARD GORE, a citizen of the United States, residing at Washington, in the District of Columbia, have invented certain new and useful Improvements in Parliamentary Indexes; and I do hereby declare the following to be a full, clear, and exact description of the invention, such as will enable others skilled in the art to which it appertains to make and use the same.

My invention relates to what might be called a parliamentary law indicator, and consists mainly of a preferably revolving disk or wheel having printed upon it in a radial manner near its outer periphery the incidental motions which might arise with respect to a main question under discussion by an assembly; below each incidental motion the answers to certain questions which may arise respecting each incidental motion; of a preferably stationary cover having an arc-like portion cut, preferably, from its upper edge in line with the radially arranged incidental motions on the disk below, and a preferably vertical inspection opening in the cover so arranged, that when the disk is revolved the answers on said disk will appear beneath the opening; and to the side of this opening certain questions which may arise with respect to any one of the incidental motions; all arranged and operating substantially as will be hereinafter described and claimed, whereby questions arising in parliamentary law respecting motions can be immediately and correctly determined thus saving a large amount of valuable time and annoyance.

Figure 1:
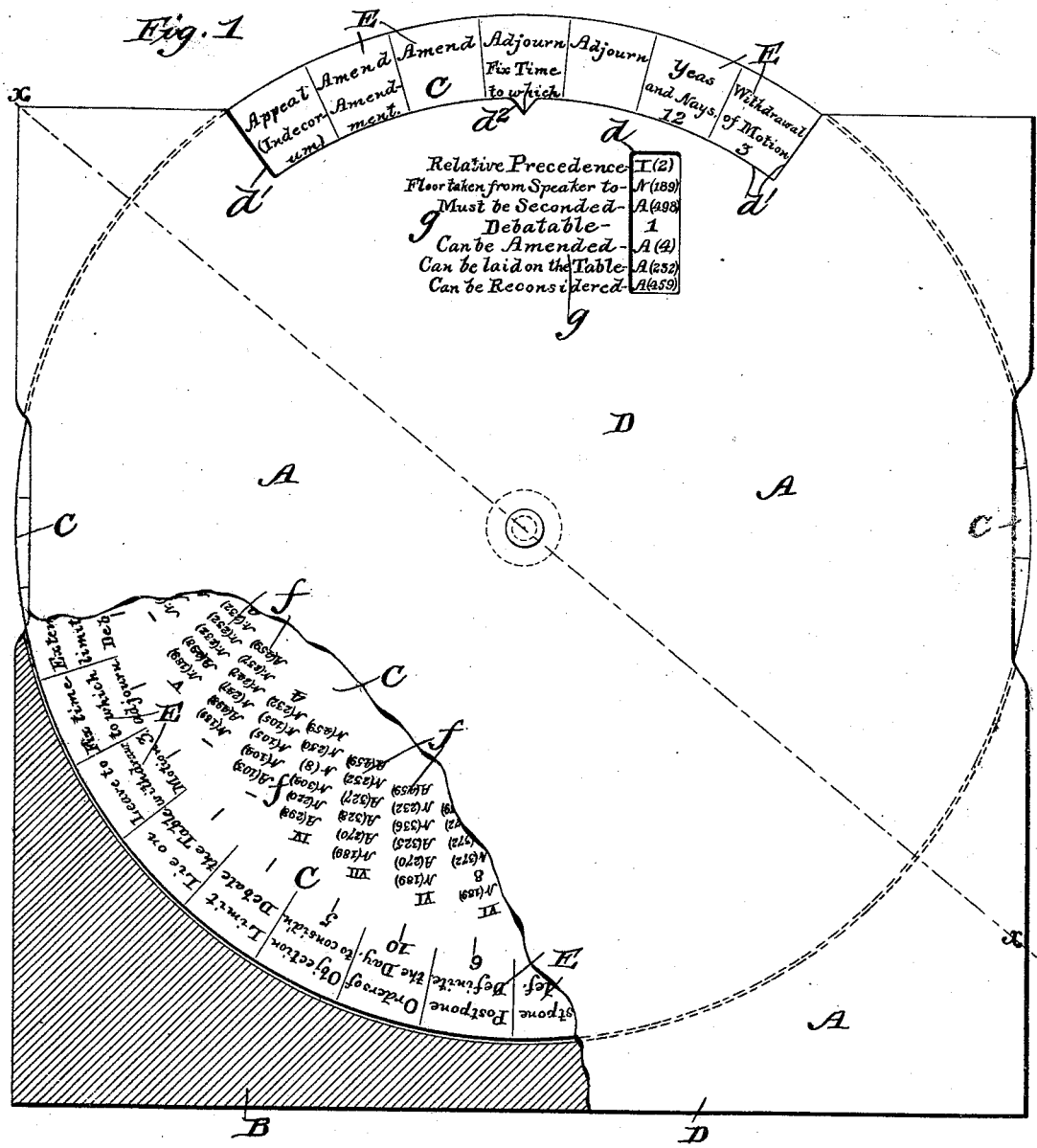
Figure 2:

In the accompanying drawings, Figure 1 is a top plan view partly in section of my parliamentary law indicator showing very clearly the general arrangement and construction of the same, and Fig. 2 is a section of the same taken in the line $x$—$x$— of Fig. 1.

A in the drawings represents my parliamentary law indicator which may be constructed of any suitable material and may be portable or be set in the top of a presiding officer's desk, in which latter case it would be provided with any suitable mechanism for operating it.

The indicator consists, preferably, of a suitable base B, a revoluble disk C and a cover or top D. The base is cut away at its side, so as to allow the disk to project slightly beyond the same, and is shaped at a portion of its upper edge to conform to the circumference of the disk. The disk is pivoted at its center to the base so as to revolve freely in either direction, and has printed upon its face, near its periphery, in a radial manner, all the incidental motions E which might arise with respect to a main question under discussion, as will be hereinafter more fully described. By incidental motion is meant any motion which would be incident to the main question before the meeting or assembly. Below each incidental motion are arranged in a column answers $f$ relative to each of the incidental motions and having a co-relation to certain questions $g$ arranged in a column on the cover or top D of the indicator alongside the opening $d$ in said cover. The cover has a segmental portion $d'$ cut from its upper end to expose to view an incidental motion or motions printed on the revoluble disk near its periphery.

In the drawings a space long enough to expose to view seven motions is shown and the motions being alphabetically arranged it can be seen at a glance which way to revolve the disk to bring a desired incidental motion to view, but it is obvious that the space might only be large enough to expose a single incidental motion, but this construction would not be so desirable as the other motions not being seen, the operator would have to guess which way to revolve the disk in order to bring the desired motion beneath the opening. This segmental space is provided with an index notch $d^2$ so located that when one of the incidental motions on the disk appears directly above the notch the correct answers to the questions $g$ on the cover relative to said motion appearing above the notch will be seen in the vertical opening $d$ in the cover. In like manner by revolving the disk the correct answers to the questions with respect to any incidental motion appearing above the index notch $d^2$ will be seen in the opening $d$. There are thirty-five incidental motions alphabetically arranged near the circumference of the disk and I have shown seven questions which might arise with respect to any one of these incidental motions, though even more questions might be added, and correct answers to each question. It is well known to those versed in parliamentary law that some motions take precedence of others, as, for instance, a motion to fix the time to adjourn takes precedence of the motion to adjourn, but it is very difficult to keep the "relative precedence" of all motions in mind, and frequently a great deal of time is consumed and sometimes errors are made in determining such questions. By relative precedence is meant the order of precedence with respect to the main question when it is under consideration. For instance, if "privileged question" was third in the order of relative precedence and was under consideration it would yield to 1 and 2 but would cut off all from 4 to 11, the latter being the lowest in order of precedence. I have represented the relative precedence in the answer column by Roman figures. Those motions which can have no order of precedence relative to the main question I would indicate by placing a dash (—) opposite, or any other suitable indication. The front and back of the indicator will have certain notes and instructions printed on them, and the motions according to their relative precedence. Let it be supposed that some question is before the meeting and a member rises and moves that the meeting do now adjourn, and another member rises and states that before that motion is put he would move that the meeting adjourn to meet next Tuesday evening at eight o'clock. The following questions might arise as to the last motion; namely, what is its relative precedence?—that is to say is the motion in order with respect to the previous motion to adjourn. Second. Can the floor be taken from the speaker?—that is, from the person who made the first motion. Third. Must the motion be seconded? Fourth. Is it debatable? Fifth. Can it be amended. Sixth. Can it be laid on the table? Seventh. Can it be reconsidered? To enable the presiding officer to answer these questions correctly and promptly, my invention will be found very useful. By turning the disk until the motion last offered, namely, to fix the time in which to adjourn appears directly above the notch, then in the vertical opening $d$ will appear the correct answers to the questions just enumerated, which are printed alongside the vertical opening as shown. In answering these questions A (aye) represents yes and N (nay) represents no. The Arabic numbers in parenthesis indicate the section in which the rule confirming the answer can be found in "*Gore's Manual.*" The numbers not in parenthesis call attention to the notes which may be printed on front of the cover. Upon an inspection of the vertical opening disclosing the answers with respect to the seven questions relative to the incidental motion to fix the time to which to adjourn, it will be found that, the relative procedure is 1, that is to say, that there can be no motion before it, and that it must take precedence of the motion to adjourn. The 2 in parenthesis refers to article 2 of *Gore's Manual* where the law or rule is fully stated. From a further inspection we find that the floor cannot be taken from the speaker; that the motion must be seconded; that it is debatable under certain conditions, and here we find the numeral 1 which refers to a note which may be printed on the cover of the indicator; that it can be amended; that it can be laid on the table, and that it can be reconsidered. By bringing any one of the incidental motions under discussion, over the notch in the disk, the correct answers to the questions printed on the cover will appear in the opening.

It is obvious that the disk might be made stationary and the top cover to revolve, but the construction described is preferable.

It is also obvious that the rules of Congress or other legislative bodies can be printed on the revoluble disk and questions arising with respect to the same can be answered in like manner to that employed in answering questions arising with respect to any of the incidental parliamentary motions as described.

What I claim as my invention is—

1. A parliamentary law indicator comprising in its construction a revoluble disk, having printed upon its face in a radial manner near its outer periphery incidental parliamentary motions and printed below said motions answers relative to said motions, and a cover provided with a segmental opening near its edge for inspecting the parliamentary motions on the disk as they are brought beneath said opening, and a vertical or radial opening for inspecting the answers to the motions as they are brought beneath said opening, and questions printed on one side of the vertical opening which, when the answers are brought beneath the opening, coincide with said answers, substantially as described.

2. A parliamentary law indicator comprising in its construction a revoluble disk having printed upon it in a radial manner near its circumference incidental parliamentary motions, and columns of answers printed on said disk below said motions, a cover having a segmental space or opening at its top for inspecting the motions on the revoluble disk as they are brought beneath the same, questions printed on the cover with respect to the motions on the disk and an index notch in the segmental space or opening of the cover, the whole being so arranged that when a motion appears above the notch in the segmental opening of the cover the correct answers to the questions printed on the cover will appear in the approximately vertical opening in said cover, substantially as described.

In testimony whereof I hereunto affix my signature in presence of two witnesses.

JAMES HOWARD GORE.

Witnesses:
E. T. FENWICK,
CASSELL SEVERANCE.